United States Patent [19]
Wakasu

[11] Patent Number: 5,886,708
[45] Date of Patent: Mar. 23, 1999

[54] GRAPHIC PROCESSOR AND A BIT-BUILT METHOD APPLIED THEREIN

[75] Inventor: Yutaka Wakasu, Tokyo, Japan

[73] Assignee: NEC Corporation, Tokyo, Japan

[21] Appl. No.: 853,898

[22] Filed: May 9, 1997

[30] Foreign Application Priority Data

May 13, 1996 [JP] Japan .................................. 8-117376

[51] Int. Cl.⁶ .................................................. G06F 15/00
[52] U.S. Cl. ........................................................... 345/435
[58] Field of Search .................................. 345/435, 113, 345/114, 522, 523, 524, 525

[56] References Cited

U.S. PATENT DOCUMENTS 5,634,040  5/1997  Her et al. ................................. 395/502
5,638,501  6/1997  Gough et al. ............................ 395/135

FOREIGN PATENT DOCUMENTS

1-1311382  12/1989  Japan .

*Primary Examiner*—Phu K. Nguyen
*Attorney, Agent, or Firm*—Foley & Lardner

[57] ABSTRACT

In order to realize a high-speed bit-built processing for superimposing pixel data of an image on to a video-memory, only substantial pixel data having color values different from a designated transparent color of a line of the image are stored in a line buffer (109) together with offset values of $\chi$-addresses in the line of the substantial pixel data stored in a offset buffer (110). A memory controller (111) reads out the substantial pixel data from the line buffer in order, and writes them in a video memory (112) at a line according to writing addresses calculated by a writing address generator (106) referring to the offset values stored in the offset buffer corresponding to the substantial pixel data.

4 Claims, 9 Drawing Sheets

GRAPHIC PROCESSOR AND A BIT-BUILT METHOD APPLIED THEREIN

BACKGROUND OF THE INVENTION

The present invention relates to a graphic processor used for computer graphics, and more particularly to that and a bit-built method applied therein for superimposing bit-map data of an image on a video memory.

Figure 9:
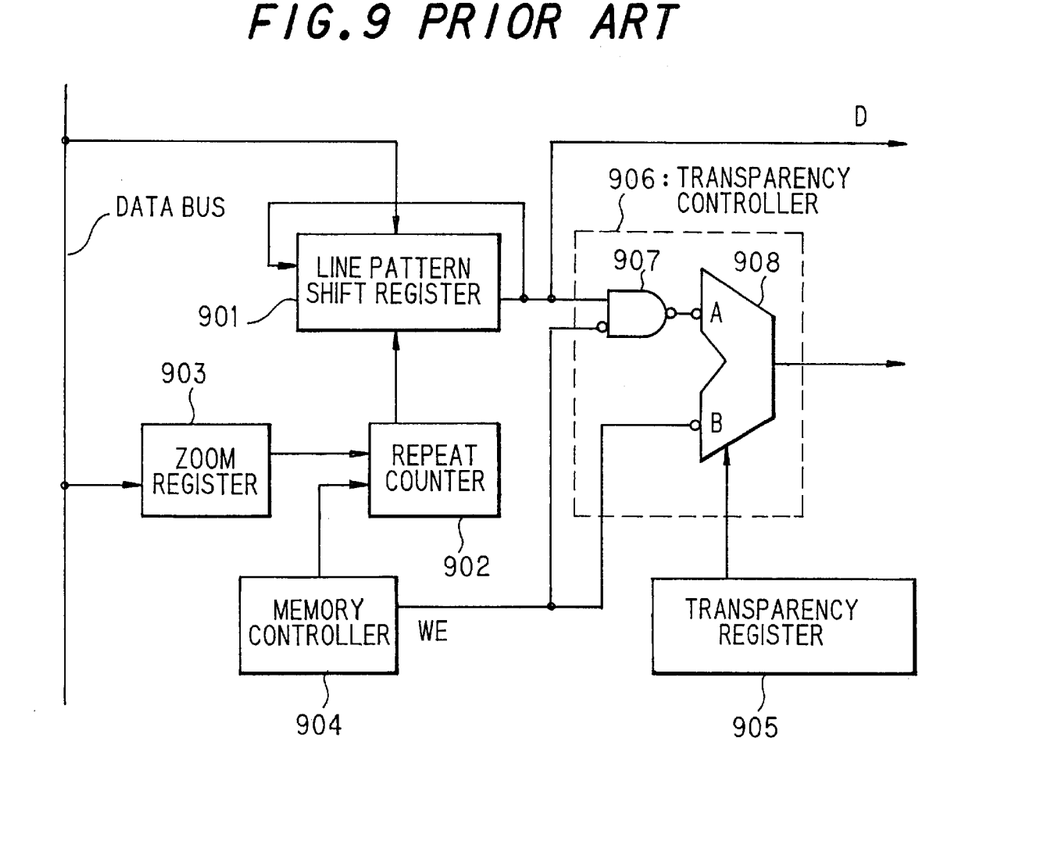
FIG. 9 is a block diagram illustrating a graphic processor according to a prior art for overwriting or superimposing bit-map data of a line pattern on a video memory.

FIG. 9 is a block diagram illustrating a graphic processor disclosed in a Japanese patent application laid open as a Provisional Publication No. 311382/'89 developed for overwriting or superimposing bit-map data of a line pattern on a video memory, comprising;

a line pattern shift register 901 of 16 bits wherein are prepared bitmap data of a line pattern for drawing a line image, which are shifted up bit by bit synchronized with a shift clock, logic of a bit shifted out being returned as a lowest significant bit to the line pattern shift register 901, a repeat counter 902 consisting of a four-bit down-counter for supplying the shift clock when its count value becomes '0', a zoom register 903 wherein a magnification factor is delivered through a data-bus DB, the magnification factor being supplied to the repeat counter 902 as a load clock, a memory controller 904 for outputting a count clock signal to be supplied to the repeat counter 902 in order to control timings of data read-out from the line pattern shift register 901, and outputting a write enable signal WE (enable at logic LOW) of the video memory (not shown in FIG. 1) in order to control timings of data writing into the video memory, a transparency register 905 wherein registered a transparency flag indicating whether the bit-map data are to be superimposed or overwritten written on the video memory, and a transparency controller 906 having a gate 907 and a selector 908, the gate 907 outputting AND logic of each bit shifted out from the line pattern shift register 901 and inverse logic of the write enable signal WE, and the selector 908 selecting output of the gate 907 when the transparency flag in the transparency register 905 is ON and selecting inverse logic of the write enable signal WE when the transparency flag is OFF.

By way of the load clock, a magnification factor, '2' for example, is set in the repeat counter 902 as the reset value to be count down according to the count clock signal from the memory controller 904. Since the line pattern shift register 901 is shifted up when the count value of the repeat counter becomes '0', the line pattern shift register 901 outputs the same bit during (the magnification factor +1) cycles, '3' cycles in the example, of the count clock, for zooming the line image.

In case the transparency flag is OFF, output of the line pattern shift register 901, that is, the repeated bit-map data is sequentially written in the video memory, according to the write enable signal WE output from the memory controller 904 and selected by the selector 908. When the transparency flag is ON, however, the selector 908 selects and outputs the output of the gate 907 instead of the write enable signal WE that becomes disable when bit logic of the repeated bit-map data is OFF, namely, indicating a transparent pixel.

Thus, line by line, bit-map data of a superimposed image are written in the video memory of the prior art, when the transparency flag is ON.

However, the superimposed image is obtained by writing in vain in the prior art, as above described, the bit-map data indicating transparent pixels of the image, wasting unnecessary processing time as much as needed for writing substantial data indicating pixels to be overwritten.

SUMMARY OF THE INVENTION

Therefore, a primary object of the present invention is to provide a graphic processor and a bit-built method applied therein, where a high-speed bit-built processing is realized for obtaining a superimposed image, by preparing only the substantial data in a line buffer to be written into the video memory.

In order to achieve the object, a bit-built method of the invention for superimposing pixel data of an image onto a video memory comprises steps of:

discriminating whether data of a pixel of the image are the same or not with data of a designated transparent color; and writing data of the pixel into a line buffer in order only when data of the pixel are discriminated to be different from data of the designated transparent color.

Another bit-built method of the invention comprises steps of:

writing data of a pixel of the image in a line buffer at an address indicated by an address value;

discriminating whether data of the pixel are the same or not with data of a designated transparent color; and incrementing the address value only when data of the pixel are discriminated to be different from data of the designated transparent color.

A graphic processor of the invention for superimposing pixel data of a first image onto data of a second image comprises:

a video memory for storing pixel data of the first and the second images;

a reading address generator for generating a reading $\chi$-address and a reading $\psi$-address for reading out pixel data of the first image from the video memory, said reading $\chi$-address beginning with a first beginning $\chi$-address and incremented every time when data of a pixel are read out when data of each line of the first image are read out from the video memory;

an offset counter for counting an offset value of the reading $\chi$-address of data of each of pixels read out of a line of the first image from the first beginning $\chi$-address;

a transparent color register for storing data of a designated transparent color;

a transparency discriminator for discriminating whether data of a pixel read out of the video memory are the same or not with data of the designated transparent color;

a line buffer capable for storing pixel data of one line of the first image;

an offset buffer for storing the offset value of each of pixels whereof data are stored at corresponding addresses of the line buffer;

a buffer controller, said buffer controller controlling the offset counter to increment the offset value every time when data of a pixel of a line of the first image are read out and to reset the offset value to zero every time when data of a line of the first image are read out, and storing data of the pixel and the offset value into the line buffer and the offset buffer, respectively, in order when data of the pixel are discriminated to be different from data of the designated transparent color by the transparency discriminator;

a writing address generator for generating a writing χ-address and a writing ψ-address for writing data of each of pixels stored in the line buffer, said writing χ-address obtained by adding, to a second beginning χ-address, the offset value stored in the offset buffer corresponding to data of said each of pixels stored in the line buffer and read out in order to be written in the video memory; and a memory controller for reading out pixel data of the first image line by line according to the reading χ-address and the reading ψ-address when controlled in a reading mode, and writing data of each of pixels read out in order of the line buffer into the video memory according to the writing χ-address and the writing ψ-address in a writing mode.

Another graphic processor of the invention comprises:

a video memory for storing pixel data of the first and the second images;

a reading address generator for generating a reading χ-address and a reading ψ-address for reading out pixel data of the first image from the video memory, said reading χ-address beginning with a first beginning χ-address and incremented every time when data of a pixel are read out when data of each line of the first image are read out from the video memory;

a transparent color register for storing data of a designated transparent color;

a transparency discriminator for discriminating whether data of a pixel read out of the video memory are the same or not with data of the designated transparent color;

a burst counter for counting an offset value of the reading χ-address of data of each of pixels read out of a line of the first image from said reading χ-address of data of a preceding pixel which are discriminated to be different from data of the designated transparent color by the transparency discriminator, said offset value initialized to one at beginning of data read-out of each line of the first image;

a line buffer capable for storing pixel data of one line of the first image;

an offset buffer for storing said offset value of each of pixels whereof data are stored at corresponding addresses of the line buffer;

a buffer controller, said buffer controller storing data of each pixel of a line of the first image and the offset value of said each pixel into the line buffer and the offset buffer, respectively, according a line address, incrementing the line address and controlling the burst counter to initialize the offset value to one when data of said each pixel are discriminated to be different from data of the designated transparent color, and controlling the burst counter to increment the offset value when data of said each pixel are discriminated to be the same with data of the designated transparent color;

a writing address generator for generating a writing χ-address and a writing ψ-address for writing data of each of pixels stored in said line buffer, said writing χ-address obtained by accumulating, onto a second beginning χ-address, said offset value stored in the offset buffer corresponding to data of said each of pixels stored in the line buffer and read out in order to be written in the video memory; and a memory controller for reading out pixel data of said first image line by line according the reading χ-address and the reading ψ-address when controlled in a reading mode, and writing data of each of pixels read out in order of the line buffer into the video memory according to the writing χ-address and the writing ψ-address in a writing mode.

Therefore, only data of substantial pixels, having other color values than the designated transparent color, are prepared in the line buffer to be written into the video memory, and so, a higher bit-built processing can be realized in the invention compared to the prior art wherein also data of transparent pixels are written in vain wasting unnecessary processing time.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts. In the drawings:

DETAILED DESCRIPTION OF THE PREFERRED EMBODIMENTS

Now, embodiments of the present invention will be described in connection with the drawings.

Figure 1:
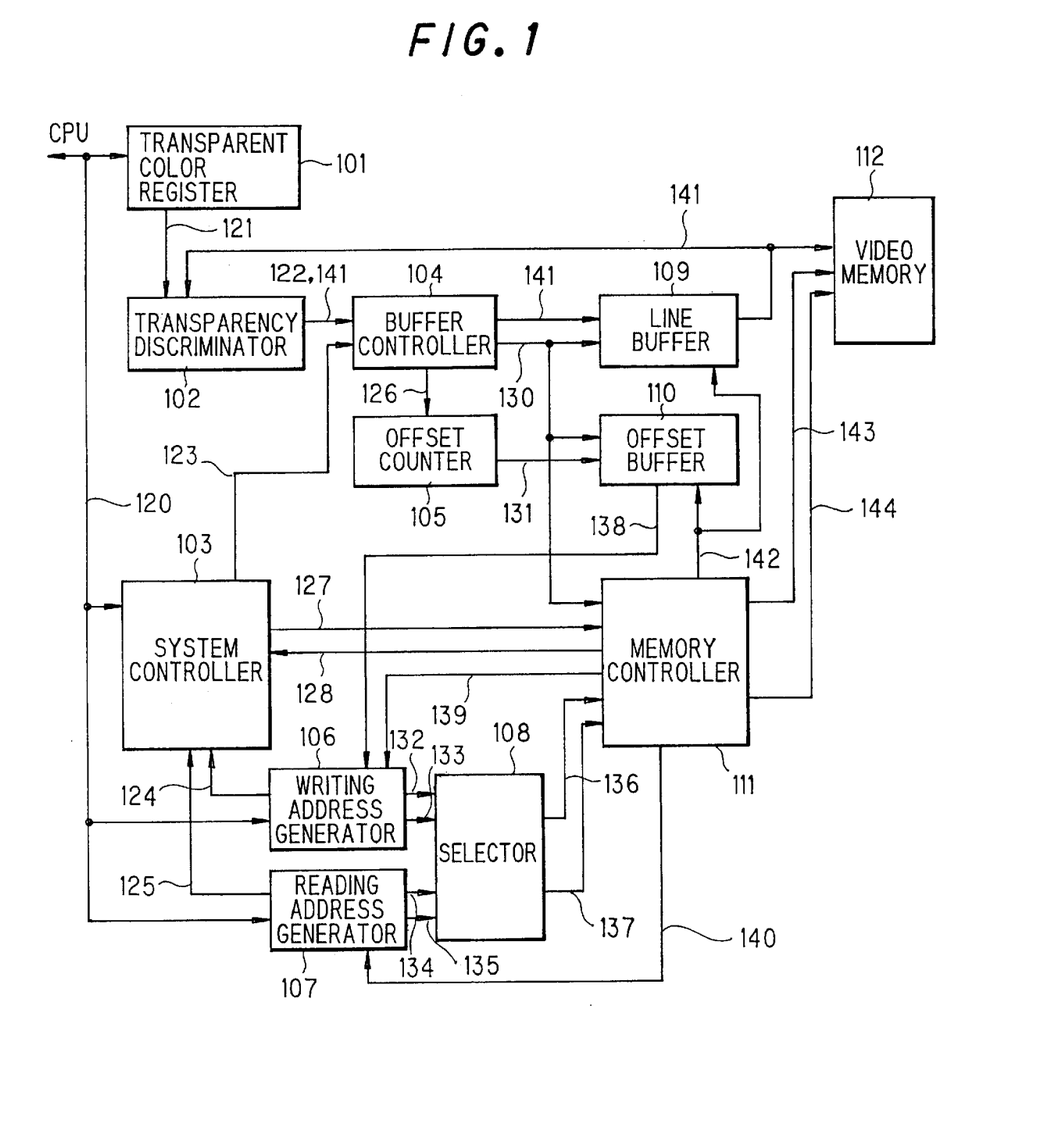
FIG. 1 is a block diagram illustrating a graphic processor according to an embodiment of the invention.

FIG. 1 is a block diagram illustrating a graphic processor according to an embodiment of the invention, wherein only substantial data of a line image are prepared in a line buffer together with offset values of their addresses registered in an offset buffer.

The graphic processor of FIG. 1 comprises;

a video memory 112 for storing image data to be read out and those to be written, a transparent color register 101 for storing a transparent color value 121 indicated by a CPU (Central Processing Unit not shown in FIG. 1), a transparency discriminator 102 for discriminating pixel data of the transparent color by comparing pixel data 141 read out from the video memory 112 with the transparent color value 121, a line buffer 109 capable for storing data of one line, an offset counter 105 for counting offset values 131 of χ-addresses of pixels read out of a line of the video memory 112 from beginning of the line, an offset buffer 110 for storing the offset values 131 of pixels stored in the line buffer 109 in addresses corresponding to addresses of the line buffer 109, a reading address generator 107 for generating reading addresses of the video memory 112 calculated from beginning and ending addresses of line data to be read out delivered through a CPU bus 120, a writing address generator 106 for generating writing addresses of the video memory 112 calculated from a beginning address of line data to be written delivered through the CPU bus 120 and the offset values 138 of χ-addresses stored in the offset buffer 110, a selector 108 for selecting output of either the writing address generator 106 or the reading address generator 107, a buffer controller 104 for controlling the offset counter 105, the line buffer 109 and the offset buffer 110, a memory controller 111 for controlling reading address of the line buffer 109 and the offset buffer 110, and performing access control to the video memory 112 according to the output selected by the selector 108, and a system controller 103 for controlling the whole system of the graphic processor.

Figure 2:
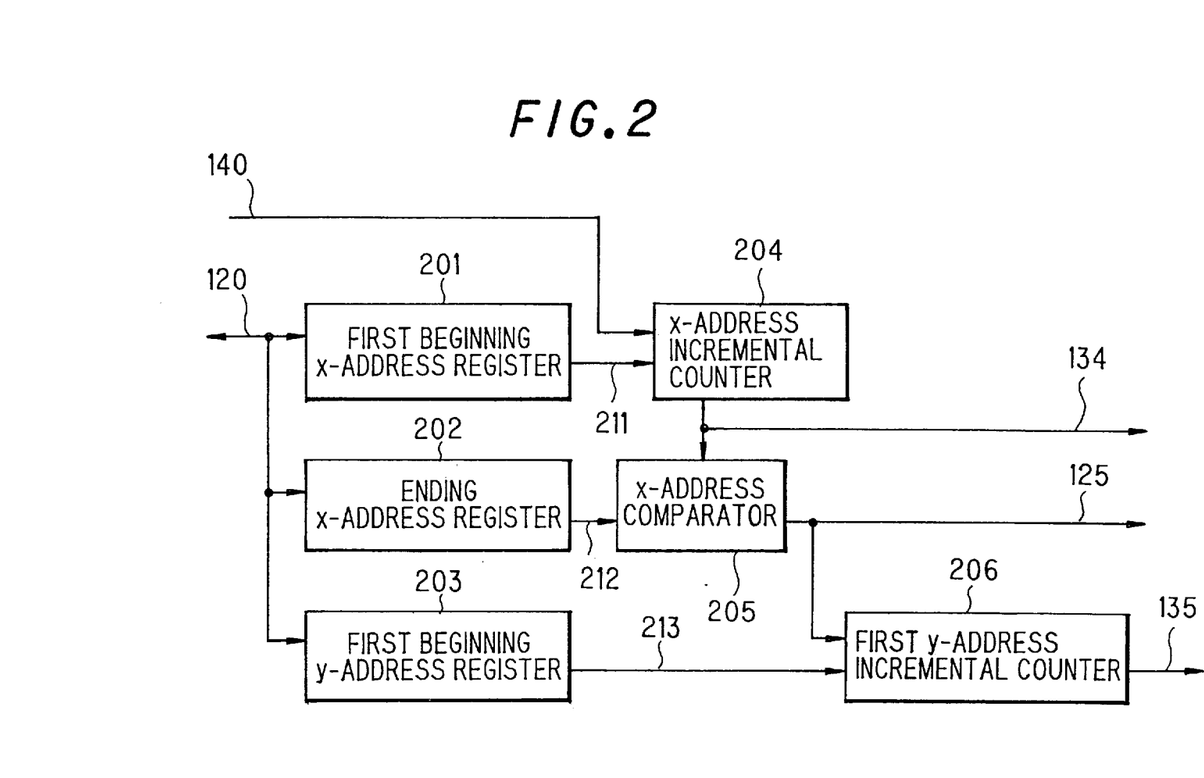
FIG. 2 is a block diagram illustrating detailed configuration of the reading address generator 107 of FIG. 1.

FIG. 2 is a block diagram illustrating detailed configuration of the reading address generator 107 of FIG. 1, comprising;

a first beginning χ-address register 201 for storing a first beginning χ-address 211 delivered through the CPU bus 120 for indicating initial value of a reading χ-address 134 for reading out data of a line from the video memory 112, an ending χ-address register 202 for storing an ending χ-address 212 delivered through the CPU bus 120 for indicating maximum value of the reading χ-address 134 for reading out data of the line, a first beginning ψ-address register 203 for storing a first beginning ψ-address 213 delivered through the CPU bus 120 for indicating initial value of a reading ψ-address 135 for reading out line data in the video memory 112, an χ-address incremental counter 204 for incrementing the reading χ-address 134 according to a reading χ-address control signal 140 delivered from the memory controller 111, an χ-address comparator 205 for generating a line end signal 125 when the reading χ-address 134 becomes the same with the ending χ-address 212 registered in the ending χ-address register 202, and a first ψ-address incremental counter 206 for incrementing the reading ψ-address 135 according to the line end signal 125 generated by the χ-address comparator 205.

Figure 3:
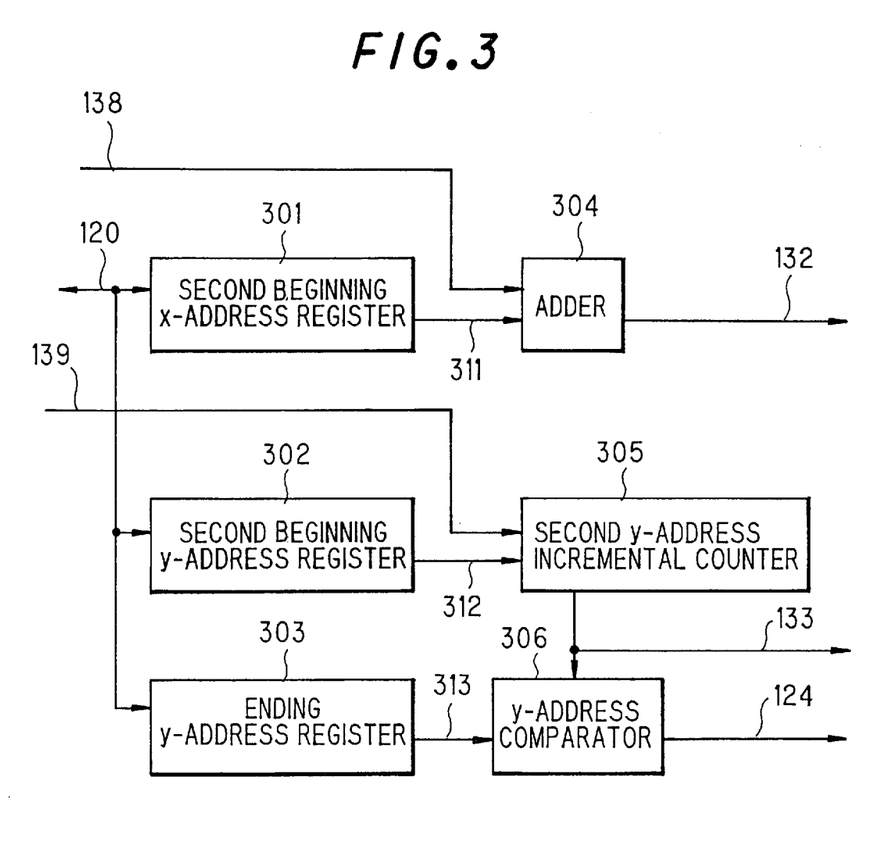
FIG. 3 is a block diagram illustrating detailed configuration of the writing address generator 106 of FIG. 1.

FIG. 3 is a block diagram illustrating detailed configuration of the writing address generator 106 of FIG. 1, comprising;

a second beginning χ-address register 301 for storing a second beginning χ-address 311 delivered through the CPU bus 120 for indicating initial value of a writing χ-address 132 for writing data of a line in the video memory 112, a second beginning ψ-address register 302 for storing a second beginning ψ-address 312 delivered through the CPU bus 120 for indicating initial value of a writing ψ-address 133 for writing line data in the video memory 112, an ending ψ-address register 303 for storing an ending ψ-address 313 delivered through the CPU bus 120 for indicating maximum value of the writing ψ-address 133 for writing the line data, an adder 304 for generating the writing χ-address 132 by adding the offset values 138 read out from the offset buffer 110 to the second beginning χ-address 311 stored in the second beginning χ-address register 301, a second ψ-address incremental counter 305 for incrementing the writing ψ-address 133 from the second beginning ψ-address 312 according to a writing ψ-address control signal 139 delivered from the memory controller 111, and a ψ-address comparator 306 for generating a bit-built end signal 124 when the writing ψ-address 133 becomes the same with the ending ψ-address 313 registered in the ending ψ-address register 303.

Now operation of the embodiment is described referring to FIGS. 1 to 4.

The CPU delivers the first beginning χ-address 211, the ending χ-address 212, the first beginning ψ-address 213, the second beginning χ-address 311, the second beginning ψ-address 312, the ending ψ-address 313 and the transparent color value 121 to the first beginning χ-address register 201, the ending χ-address register 202, the first beginning ψ-address register 203, the second beginning χ-address register 301, the second beginning ψ-address register 302, the ending ψ-address register 303 and the transparent color register 101, respectively, through the CPU bus 120.

Then, the CPU controls the system controller 103 to perform a bit-built processing. The system controller 103 sets the memory controller 111 in a reading mode and the selector 108 to select the reading addresses generated by the reading address generator 107, and the memory controller 111 begins to read out the pixel data 141 from the video memory 112 according to the reading addresses.

The pixel data 141 are supplied to the transparency discriminator 102, which discriminates whether value of the pixel data 141 is the same with the transparent color value 121 and transfers the pixel data 141 to the buffer controller 104 together with the discrimination result 122.

When the discrimination result 122 shows a transparent pixel, the buffer controller 104 only increments offset value 131 in the offset counter 105, the line buffer 109 and the offset buffer 110 taking no action.

When the discrimination result 122 shows the pixel data 141 have other value than the transparent color 121, the buffer controller 104 controls the line buffer 109 to register the pixel data 141 and the offset buffer 110 to register the offset value 131, and increments the offset value 131 and a writing address 130 for both of the line buffer 109 and the offset buffer 110.

The offset value 131 in the offset counter 105, initial value thereof being '0', is incremented one by one when data of a pixel, transparent or not, are read out from the video memory 112, and it is reset to '0' when data of a line are read out, controlled by the buffer controller 104.

The reading address generator 107 increments the reading χ-address 134 every time when data of a pixel are read out from the video memory 112 in accordance with the reading χ-address control signal 140 from the memory controller 111, which continues data readout from the video memory 112 with the revised reading χ-address 134. When the reading χ-address becomes the same with the ending χ-address 212 registered in the ending χ-address register 202, the χ-address comparator 205 generates the line read end signal 125.

Figure 4:
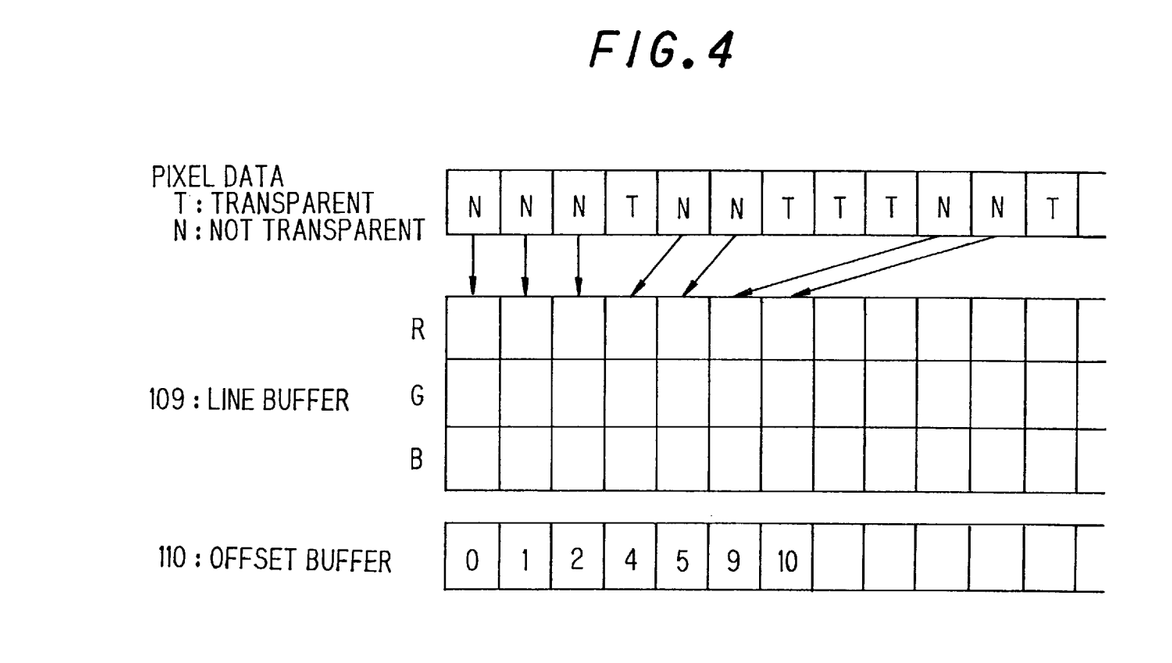
FIG. 4 is a schematic diagram illustrating contents of the line buffer 109 and the offset buffer 110 of FIG. 1.

Thus, when data of a line are accomplished to be read out, only data of substantial pixels having other color values than the transparent color 121 are prepared in the line buffer 109, together with their offset values of χ-addresses from the beginning of the line stored at their corresponding addresses in the offset buffer 110, as illustrated in FIG. 4.

Receiving the line read end signal 125, the system controller 103 controls the memory controller 111 in a writing mode and the selector 108 to select outputs of the writing address generator 106, for beginning a data write process.

The memory controller 111 controls the line buffer 109 and the offset buffer 110 with a reading address 142 to output their registered data from beginning of their addresses. The adder 304 of the writing address generator 106 adds the offset value 138 delivered from the offset buffer 110 to the second beginning χ-address 311 in the second beginning χ-address register 301 for generating the writing χ-address 132, which is selected by the selector 108 to be delivered to the memory controller 111. The memory controller 111 writes data of a pixel output from the line buffer 109 into the video memory 112 according to the writing addresses generated by the writing address generator 106.

After writing data of a pixel, the memory controller increments the reading address 142 of the line buffer 109 and the offset buffer 110 and continues the data write process.

When the reading address 142 becomes the same with the writing address 130, which is left in the buffer controller 104 indicating addresses of the line buffer 109 and the offset buffer 110 where the last substantial pixel data and their offset value are stored, the memory controller 111 sends a line write end signal 128 to the system controller 103.

Receiving the line write end signal 128, the system controller 103 changes over the memory controller 111 and the selector 108 into the reading mode and initializes the buffer controller 104 for clearing the offset counter 105, and a data read process begins to be performed for the next line of the video memory 112.

Thus, the bit-built processing is continued until the writing ψ-address 133 becomes the same with the ending ψ-address 313 registered in the ending ψ-address register 303 and the bit-built end signal 124 is generated by the ψ-address comparator 306.

As heretofore described, only data of substantial pixels having other color values than the transparent color 121 are prepared in the line buffer 109 to be written into the video memory 112, in the embodiment. Therefore, a higher bit-built processing can be realized compared to the prior art wherein also data of transparent pixels are written in vain wasting unnecessary processing time.

The line buffer can be prepared with only data of substantial pixels also by overwriting data of a transparent pixel with data of a substantial pixel.

Figure 5:
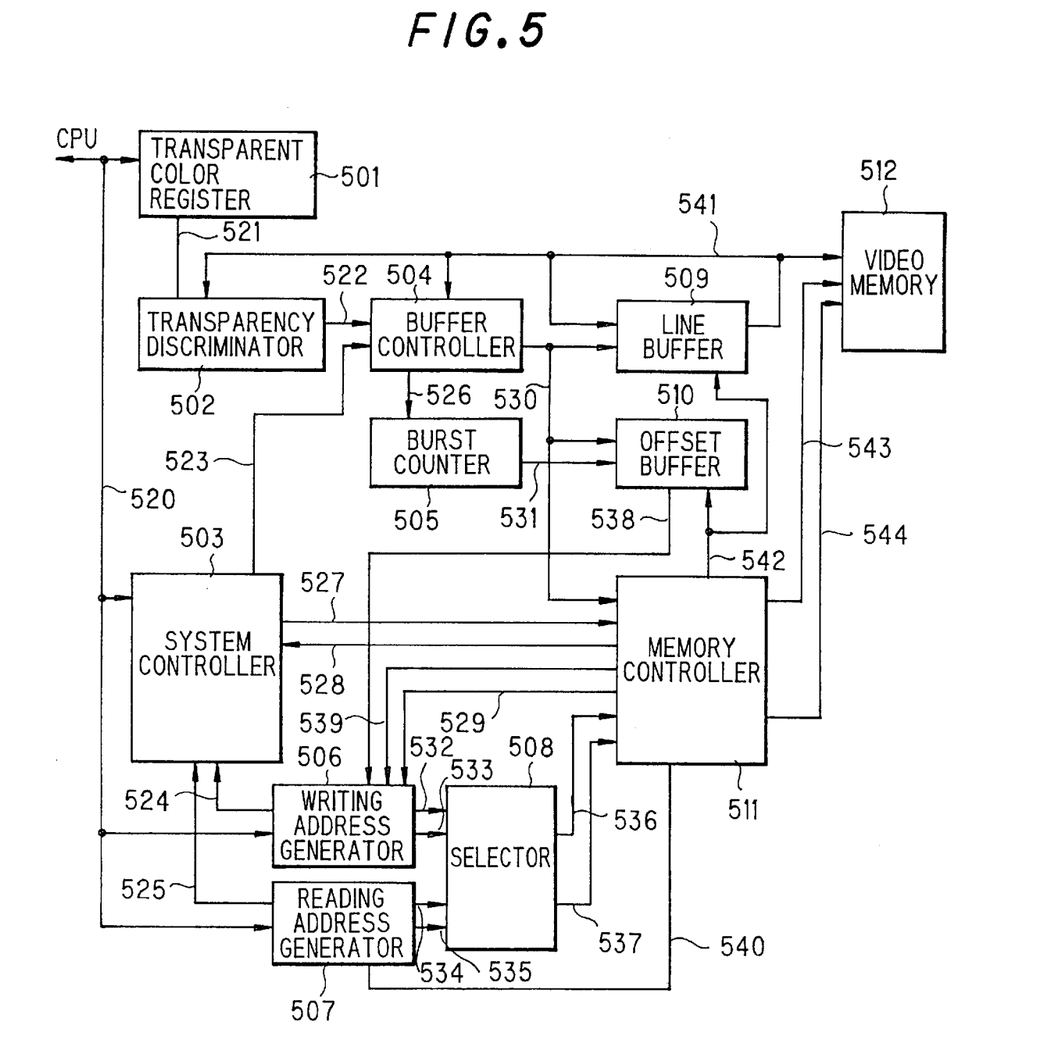
FIG. 5 is a block diagram illustrating a graphic processor according to another embodiment of the invention.

FIG. 5 is a block diagram illustrating a graphic processor according to another embodiment of the invention, comprising;

a video memory 512 for storing image data to be read out and those to be written, a transparent color register 501 for storing a transparent color value 521 indicated by a CPU, a transparency discriminator 502 for discriminating pixel data of the transparent color by comparing pixel data 541 read out from the video memory 512 with the transparent color value 521, a line buffer 509 capable for storing data of one line, a burst counter 505 for counting offset values 531 of χ-addresses of pixels read out of a line of the video memory 512 from χ-addresses of their preceding substantial pixels of the line having other color values than the transparent color 521, an offset buffer 510 for storing the offset values 531 of pixels stored in the line buffer 509 in addresses corresponding to addresses of the line buffer 509, a reading address generator 507 for generating reading addresses of the video memory 512 calculated from beginning and ending addresses of line data to be read out delivered through a CPU bus 520, a writing address generator 506 for generating writing addresses of the video memory 512 calculated by accumulating the offset values 538 of χ-addresses stored in the offset buffer 510 to a beginning address of line data to be written delivered through the CPU bus 520 and, a selector 508 for selecting output of either the writing address generator 506 or the reading address generator 507, a buffer controller 504 for controlling the burst counter 505, the line buffer 509 and the offset buffer 510, a memory controller 511 for controlling reading address of the line buffer 509 and the offset buffer 510, and performing access control to the video memory 512 according to the output selected by the selector 508, and a system controller 503 for controlling the whole system of the graphic processor.

Figure 6:
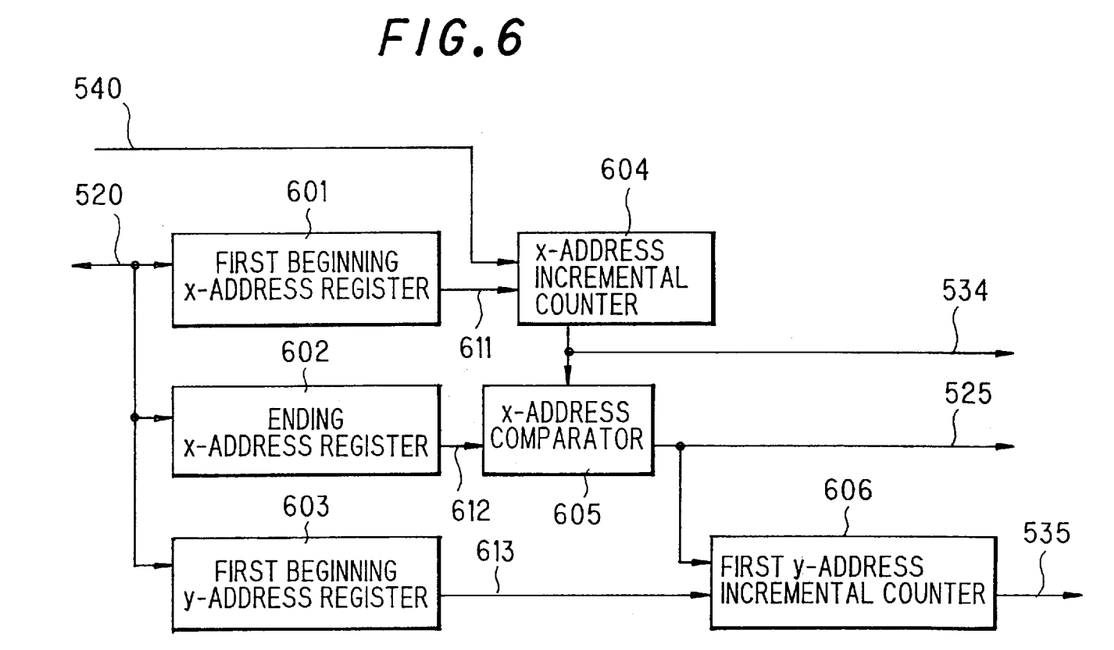
FIG. 6 is a block diagram illustrating detailed configuration of the reading address generator 507 of FIG. 5.

FIG. 6 is a block diagram illustrating detailed configuration of the reading address generator 507 of FIG. 5, comprising;

a first beginning χ-address register 601 for storing a first beginning χ-address 611 delivered through the CPU bus 520 for indicating initial value of a reading χ-address 534 for reading out data of a line from the video memory 512, an ending χ-address register 602 for storing an ending χ-address 612 delivered through the CPU bus 520 for indicating maximum value of the reading χ-address 534 for reading out data of the line, a first beginning ψ-address register 603 for storing a first beginning ψ-address 613 delivered through the CPU bus 520 for indicating initial value of a reading ψ-address 535 for reading out line data in the video memory 512, an χ-address incremental counter 604 for incrementing the reading χ-address 534 according to a reading χ-address control signal 540 delivered from the memory controller 511, an χ-address comparator 605 for generating a line end signal 525 when the reading χ-address 534 becomes the same with the ending χ-address 612 registered in the ending χ-address register 602, and a first ψ-address incremental counter 606 for incrementing the reading ψ-address 535 according to the line end signal 525 generated by the χ-address comparator 605.

Figure 7:
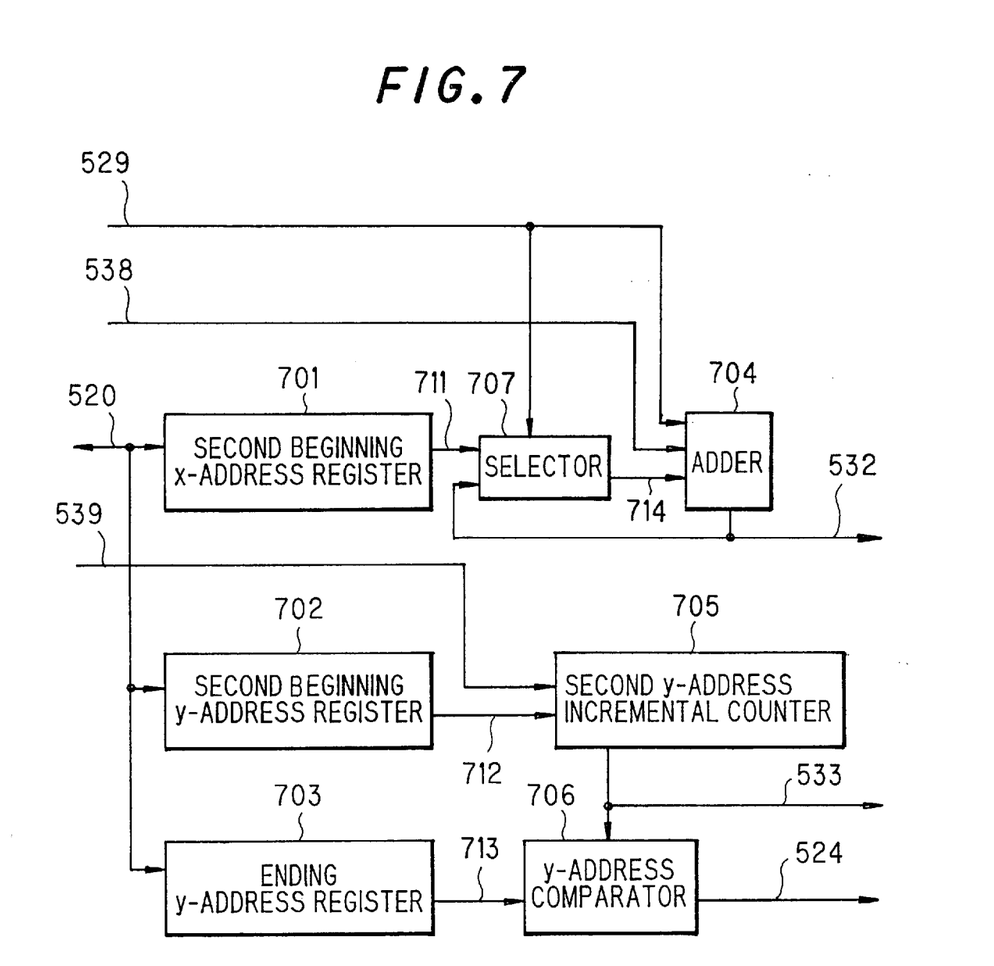
FIG. 7 is a block diagram illustrating detailed configuration of the writing address generator 506 of FIG. 5.

FIG. 7 is a block diagram illustrating detailed configuration of the writing address generator 506 of FIG. 5, comprising;

a second beginning χ-address register 701 for storing a second beginning χ-address 711 delivered through the CPU bus 520 for indicating initial value of a writing χ-address 532 for writing data of a line in the video memory 512, a second beginning ψ-address register 702 for storing a second beginning ψ-address 712 delivered through the CPU bus 520 for indicating initial value of a writing ψ-address 533 for writing line data in the video memory 512, an ending ψ-address register 703 for storing an ending ψ-address 713 delivered through the CPU bus 520 for indicating maximum value of the writing ψ-address 533 for writing the line data, a selector 707 for selecting the second beginning χ-address 711 stored in the second beginning χ-address register 701 at beginning of each data write process and otherwise selecting actual value of the writing χ-address 532, controlled with an χ-address control signal 529 delivered from the memory controller 511, an adder 704 for generating the writing χ-address 532 by adding the offset values 538 read out from the offset buffer 510 to the output of the selector 707, a second ψ-address incremental counter 705 for incrementing the writing ψ-address 533 from the second beginning ψ-address 712 according to a writing ψ-address control signal 539 delivered from the memory controller 511, and a ψ-address comparator 706 for generating a bit-built end signal 524 when the writing ψ-address 533 becomes the same with the ending ψ-address 713 registered in the ending ψ-address register 703.

Now operation of the embodiment is described referring to FIGS. 5 to 8.

The CPU delivers the first beginning χ-address 611, the ending χ-address 612, the first beginning ψ-address 613, the second beginning χ-address 711, the second beginning ψ-address 712, the ending ψ-address 713 and the transparent color value 521 to the first beginning χ-address register 601, the ending χ-address register 602, the first beginning ψ-address register 603, the second beginning χ-address register 701, the second beginning ψ-address register 702, the ending ψ-address register 703 and the transparent color register 501, respectively, through the CPU bus 520.

Then, the CPU controls the system controller 503 to perform a bit-built processing. The system controller 503 sets the memory controller 511 in a reading mode and the selector 508 to select the reading addresses generated by the reading address generator 507, and the memory controller 511 begins to read out the pixel data 541 from the video memory 512 according to the reading addresses.

The pixel data 541 are supplied to the transparency discriminator 502 and the buffer controller 504. The transparency discriminator 502 discriminates whether value of the pixel data 541 is the same with the transparent color value 521 and transfers discrimination result 522 to the buffer controller 504. The buffer controller 504 stores the pixel data 541 into the line buffer 509 and the offset value 531 counted in the burst counter 505 into the offset buffer 510.

Here, the buffer controller 504 only increments the offset value 531 in the burst counter 505, and leaves writing address 530 for the line buffer 509 and the offset buffer 510 left not revised, when the discrimination result 522 shows a transparent pixel, while it initializes the offset value 531 to '1' and increments the writing address for the line buffer 509 and the offset buffer 510, when the discrimination result 522 shows the pixel data 541 have other value than the transparent color 521. So, the offset value 531 in the burst counter 505, initial value thereof being '1', is incremented when data of a transparent pixel are read out from the video memory 512, and it is reset to '1' when data of a substantial pixel are read out.

Therefore, data of every transparent pixel in the line buffer 509 are overwritten with data of a following substantial pixel and an offset value of χ-address from its preceding substantial pixel is stored at corresponding address of the offset buffer 510.

The reading address generator 507 increments the reading χ-address 534 every time when data of a pixel are read out from the video memory 512 in accordance with the reading χ-address control signal 540 from the memory controller 511, which continues data readout from the video memory 512 with the revised reading χ-address 534. When the reading χ-address becomes the same with the ending χ-address 612 registered in the ending χ-address register 602, the χ-address comparator 605 generates the line read end signal 625.

Figure 8:
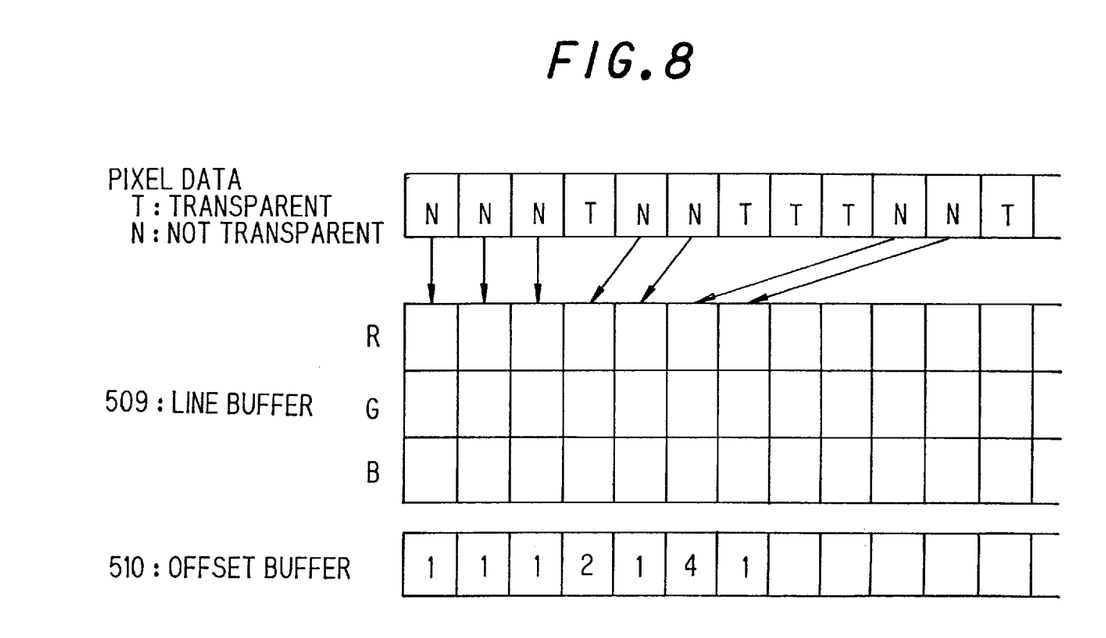
FIG. 8 is a schematic diagram illustrating contents of the line buffer 509 and the offset buffer 510 of FIG. 5.

Thus, when data of a line are accomplished to be read out, only data of substantial pixels having other color values than the transparent color 521 are prepared in the line buffer 509, together with their offset values of χ-addresses from their preceding substantial pixels stored at their corresponding addresses in the offset buffer 510, as illustrated in FIG. 8.

Receiving the line read end signal 525, the system controller 503 controls the memory controller 511 in a writing mode and the selector 508 to select outputs of the writing address generator 506, for beginning a data write process.

The memory controller 511 controls the line buffer 509 and the offset buffer 510 with a reading address 542 to output their registered data from beginning of their addresses.

The selector 707 in the writing address generator 506 selects the first beginning χ-address 611 registered in the first beginning χ-address register 601 and the adder 704 output it as the writing χ-address 532 for the first pixel of the line to be written in the video memory 512, controlled with the χ-address control signal 529. Afterwards, the selector 707 is controlled to select output of the adder 704, which adds the offset value 538 delivered from the offset buffer 510 to the output of the selector 707, that is, the actual value of the writing χ-address 532 synchronized with the χ-address control signal 529, for generating the writing χ-address 532 for a following substantial pixel to be written in the video memory 512.

The memory controller 511 writes data of a substantial pixel output from the line buffer 509 into the video memory 512 according to the writing addresses thus generated by the writing address generator 506.

After writing data of a pixel, the memory controller increments the reading address 542 of the line buffer 509 and the offset buffer 510 and continues the data write process.

When the reading address 542 becomes the same with the writing address 530, which is left in the buffer controller 504 indicating addresses of the line buffer 509 and the offset buffer 510 where the last substantial pixel data and their offset value are stored, the memory controller 511 sends a line write end signal 528 to the system controller 503.

Receiving the line write end signal 528, the system controller 503 changes over the memory controller 511 and the selector 508 into the reading mode and initializes the buffer controller 504 for initializing offset value 531 in the burst counter 505 into '1', and a data read process begins to be performed for the next line of the video memory 512.

Thus, the bit-built processing is continued until the writing ψ-address 533 becomes the same with the ending ψ-address 713 registered in the ending ψ-address register 703 and the bit-built end signal 524 is generated by the ψ-address comparator 706.

As heretofore described, only data of substantial pixels having other color values than the transparent color 521 are prepared in the line buffer 509 to be written into the video memory 512, also in the embodiment of FIG. 5, realizing a higher bit-built processing compared to the prior art.

What is claimed is:

1. A bit-built method for superimposing pixel data of an image onto a video memory; comprising steps of:

discriminating whether data of a pixel of the image are the same or not with data of a designated transparent color; and writing data of said pixel into a line buffer in order only when data of said pixel are discriminated to be different from data of said designated transparent color.

2. A bit-built method for superimposing pixel data of an image onto a video memory; comprising steps of:

writing data of a pixel of the image in a line buffer at an address indicated by an address value;

discriminating whether data of said pixel are the same or not with data of a designated transparent color; and incrementing said address value only when data of said pixel are discriminated to be different from data of said designated transparent color.

3. A graphic processor for superimposing pixel data of a first image onto data of a second image; comprising:

a video memory for storing pixel data of the first and the second images;

a reading address generator for generating a reading $\chi$-address and a reading $\psi$-address for reading out pixel data of the first image from said video memory, said reading $\chi$-address beginning with a first beginning $\chi$-address and incremented every time when data of a pixel are read out when data of each line of the first image are read out from said video memory;

an offset counter for counting an offset value of said reading $\chi$-address of data of each of pixels read out of a line of the first image from said first beginning $\chi$-address;

a transparent color register for storing data of a designated transparent color;

a transparency discriminator for discriminating whether data of a pixel read out of said video memory are the same or not with data of said designated transparent color;

a line buffer capable for storing pixel data of one line of the first image;

an offset buffer for storing said offset value of each of pixels whereof data are stored at corresponding addresses of said line buffer;

a buffer controller, said buffer controller controlling said offset counter to increment said offset value every time when data of a pixel of a line of the first image are read out and to reset said offset value to zoro every time when data of a line of the first image are read out, and storing data of said pixel and said offset value into said line buffer and said offset buffer, respectively, in order when data of said pixel are discriminated to be different from data of said designated transparent color by said transparency discriminator;

a writing address generator for generating a writing $\chi$-address and a writing $\psi$-address for writing data of each of pixels stored in said line buffer, said writing $\chi$-address obtained by adding, to a second beginning $\chi$-address, said offset value stored in said offset buffer corresponding to data of said each of pixels stored in said line buffer and read out in order to be written in said video memory; and a memory controller for reading out pixel data of the first image line by line according to said reading $\chi$-address and said reading $\psi$-address when controlled in a reading mode, and writing data of each of pixels read out in order of said line buffer into said video memory according to said writing $\chi$-address and said writing $\psi$-address in a writing mode.

4. A graphic processor for superimposing pixel data of a first image onto data of a second image; comprising:

a video memory for storing pixel data of the first and the second images;

a reading address generator for generating a reading $\chi$-address and a reading $\psi$-address for reading out pixel data of the first image from said video memory, said reading $\chi$-address beginning with a first beginning $\chi$-address and incremented every time when data of a pixel are read out when data of each line of the first image are read out from said video memory;

a transparent color register for storing data of a designated transparent color;

a transparency discriminator for discriminating whether data of a pixel read out of said video memory are the same or not with data of said designated transparent color;

a burst counter for counting an offset value of said reading $\chi$-address of data of each of pixels read out of a line of the first image from said reading $\chi$-address of data of a preceding pixel which are discriminated to be different from data of said designated transparent color by said transparency discriminator, said offset value initialized to one at beginning of data read-out of each line of the first image;

a line buffer capable for storing pixel data of one line of the first image;

an offset buffer for storing said offset value of each of pixels whereof data are stored at corresponding addresses of said line buffer;

a buffer controller, said buffer controller storing data of each pixel of a line of the first image and said offset value of said each pixel into said line buffer and said offset buffer, respectively, according a line address, incrementing said line address and controlling said burst counter to initialize said offset value to one when data of said each pixel are discriminated to be different from data of said designated transparent color, and controlling said burst counter to increment said offset value when data of said each pixel are discriminated to be the same with data of said designated transparent color;

a writing address generator for generating a writing $\chi$-address and a writing $\psi$-address for writing data of each of pixels stored in said line buffer, said writing $\chi$-address obtained by accumulating, onto a second beginning $\chi$-address, said offset value stored in said offset buffer corresponding to data of said each of pixels stored in said line buffer and read out in order to be written in said video memory; and a memory controller for reading out pixel data of the first image line by line according said reading $\chi$-address and said reading $\psi$-address when controlled in a reading mode, and writing data of each of pixels read out in order of said line buffer into said video memory according to said writing $\chi$-address and said writing $\psi$-address in a writing mode.

* * * * *